(12) United States Patent
Kawai

(10) Patent No.: US 11,847,859 B2
(45) Date of Patent: Dec. 19, 2023

(54) INFORMATION PROCESSING DEVICE, METHOD, AND PROGRAM RECORDING MEDIUM

(71) Applicant: NEC Corporation, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 17/637,154

(22) PCT Filed: Sep. 2, 2019

(86) PCT No.: PCT/JP2019/034425
§ 371 (c)(1),
(2) Date: Feb. 22, 2022

(87) PCT Pub. No.: WO2021/044484
PCT Pub. Date: Mar. 11, 2021

(65) Prior Publication Data
US 2022/0284734 A1    Sep. 8, 2022

(51) Int. Cl.
G06V 40/20 (2022.01)
G06T 7/73 (2017.01)
G06V 10/70 (2022.01)
G06V 40/10 (2022.01)

(52) U.S. Cl.
CPC .............. *G06V 40/20* (2022.01); *G06T 7/73* (2017.01); *G06V 10/70* (2022.01); *G06V 40/10* (2022.01); *G06T 2207/30196* (2013.01)

(58) Field of Classification Search
CPC ........ G06V 40/20; G06V 10/70; G06V 40/10; G06V 40/23; G06T 7/73; G06T 2207/30196; G06T 7/20
See application file for complete search history.

(56) References Cited

FOREIGN PATENT DOCUMENTS

| JP | 2011-194073 A | 10/2011 |
|---|---|---|
| JP | 6119938 B2 | 4/2017 |
| WO | 2018/159542 A1 | 9/2018 |
| WO | 2018/163555 A1 | 9/2018 |

OTHER PUBLICATIONS

Machine translation for JP 2011-194073, IDS (Year: 2011).*
Machine translation for WO 2018/163555, IDS (Year: 2018).*
International Search Report for PCT Application No. PCT/JP2019/034425, dated Oct. 8, 2019.
English translation of Written opinion for PCT Application No. PCT/JP2019/034425, dated Oct. 8, 2019.

* cited by examiner

*Primary Examiner* — Qian Yang
(74) *Attorney, Agent, or Firm* — Sughrue Mion, PLLC

(57) ABSTRACT

To efficiently determine learning data for estimating an unknown behavior by a machine, an information processing device according to the present invention is provided with: an information acquisition means for acquiring an image including a person; and a feature conversion means for converting skeleton information extracted from the image into a feature vector which indicates elements constituting a behavior of the person and is a lower dimension than the skeleton information.

11 Claims, 16 Drawing Sheets

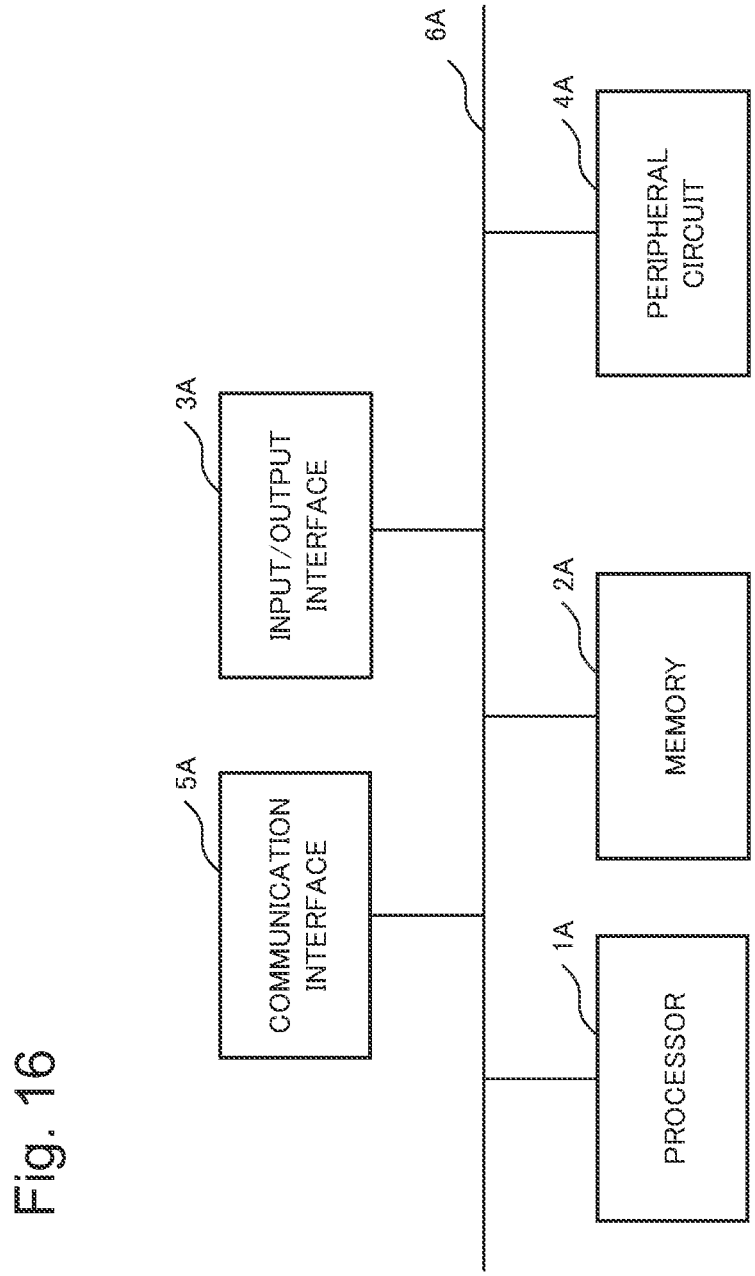

006# INFORMATION PROCESSING DEVICE, METHOD, AND PROGRAM RECORDING MEDIUM

This application is a National Stage Entry of PCT/JP2019/034425 filed on Sep. 2, 2019, the contents of all of which are incorporated herein by reference, in their entirety.

TECHNICAL FIELD

The present invention relates to a system, a method, and a program for briefly expressing a behavior of a person in a video.

BACKGROUND ART

In recent years, some techniques for enabling estimation using a small amount of learning data have been proposed in order to estimate a behavior of a person appearing in a surveillance camera.

A technique described in PTL 1 estimates a behavior from information on a surrounding object in addition to posture information of a person. Since information is insufficient only with the posture information of the person, it is possible to perform estimation with higher accuracy by supplementing the information with the information on the surrounding object.

A technique described in PTL 2 estimates a behavior of a person leaving a bed or entering the bed conversely from a change in an overlapping state between a bed region and a person region.

A technique described in PTL 3 expresses a behavior by a combination of several bases to simplify the complicated behavior. For example, simple body motions, such as "raising an arm", "crouching", and "moving to the right" are set as bases, and a behavior such as "looking for a component" is expressed by a combination thereof.

CITATION LIST

Patent Literature

[PTL 1] WO 2018/163555 A
[PTL 2] Japanese Patent No. 6119938
[PTL 3] WO 2018/159542 A

SUMMARY OF INVENTION

Technical Problem

Although the techniques described in PTLs 1 to 3 learn and estimate limited known behaviors by a machine, it is difficult to efficiently determine learning data for estimating an unknown behavior.

An object of the present invention is to provide a technique capable of solving the above-described problem.

Solution to Problem

According to the present invention,
provided is an information processing device including:
an information acquisition means configured to acquire an image including a person; and
a feature conversion means configured to convert skeleton information extracted from the image into a feature vector which indicates elements constituting a behavior of the person and is a lower dimension than the skeleton information.

According to the present invention,
provided is an information processing device including:
an information acquisition means configured to acquire an image including a person; and
a feature conversion means configured to convert skeleton information extracted from the image into a feature vector which indicates elements constituting a behavior of the person and is a lower dimension than the skeleton information, in which
the feature conversion means converts the skeleton information using a feature conversion formula determined to cover the behavior of the person.

According to the present invention,
provided is an information processing method including:
acquiring an image including a person; and
converting skeleton information extracted from the image into a feature vector which indicates elements constituting a behavior of the person and is a lower dimension than the skeleton information.

According to the present invention,
provided is a program for causing a computer to execute:
a process of acquiring an image including a person; and
a process of converting skeleton information extracted from the image into a feature vector which indicates elements constituting a behavior of the person and is a lower dimension than the skeleton information.

Advantageous Effects of Invention

According to the present invention, it is possible to efficiently determine the learning data for estimating the unknown behavior by the machine.

BRIEF DESCRIPTION OF DRAWINGS

FIG. 16 is an example of a hardware configuration of the information processing device according to the present example embodiment.

EXAMPLE EMBODIMENT

0 Background

Figure 1:
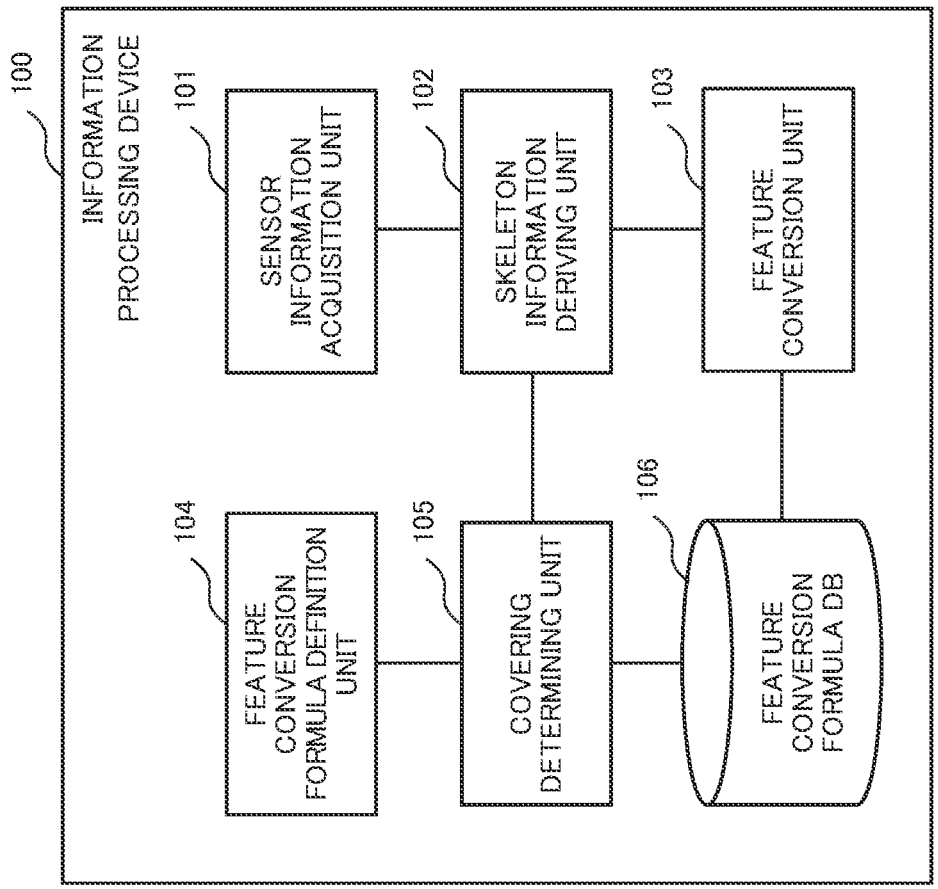
FIG. 1 is an example of a configuration diagram of an information processing device according to a present example embodiment.

First, the background of the present invention will be described in order to facilitate understanding of example embodiments of the present invention.

In recent years, many techniques have been developed for estimating what kind of behavior a person appearing in an image has by processing the image of a surveillance camera or the like by a computer. However, behaviors of persons are extremely complicated and diverse. Even if it can be objectively estimated as the same behavior when viewed by a human, actual motions taken by persons actually differs in a strict sense due to individual differences of persons, a difference in surrounding environment, and the like. When a behavior of "running" is taken as an example, a running speed differs depending on a person, and it is easy to imagine that running speeds, positions of limbs, and the like differ depending on environments such as situations of the ground (a stadium, a sand beach, and the like) and a congestion degree of the surroundings. That is, when the behavior of the person is estimated by the computer, it is often necessary to prepare a very large amount of learning data to cope with a difference in person or environment. However, there is a limit for data that can be prepared depending on a behavior to be desirably recognized. Therefore, some techniques that enable behavior estimation with a small amount of learning data have been proposed.

For example, a technique described in PTL 1 estimates a behavior from information on a surrounding object in addition to posture information of a person. Since information is insufficient only with the posture information of the person, it is possible to perform estimation with higher accuracy by supplementing the information with the information on the surrounding object. For example, when a person is in a sitting posture, it is recognized that the person enters a bed (lies on the bed) if the bed exists around the person or the person is sitting on a chair if the chair exists. An object that exists in the surroundings of a person can be an important element in identifying a behavior of the person as described in the technique described in PTL 1. However, it is difficult to estimate the behavior of the person in a state where there is no clue in the surroundings according to this technique.

A technique described in PTL 2 estimates behaviors of a person, such as leaving a bed and entering the bed conversely, from a change in an overlapping state between a bed region and a person region. As in the technique described in PTL 2, a method of determining a rule that can reliably estimate a behavior to be desirably identified is effective if the number of types of behaviors to be desirably identified is small, but it is difficult to set the rule when the number of types increases.

Furthermore, a technique described in PTL 3 expresses a behavior by a combination of several bases to simplify the complicated behavior. For example, simple body motions, such as "raising an arm", "crouching", and "moving to the right" are set as bases, and a more complicated behavior such as "looking for a component" is expressed by a combination thereof. Since the technique described in PTL 3 expresses various behaviors by combinations of simple behaviors, it is possible to absorb differences depending on persons and environments, and to learn many behaviors with less learning data. However, it is necessary to define basic behaviors that can cover human behaviors as the bases in order to enable recognition of all the behaviors including unknown behaviors. In the technique described in PTL 3, the behaviors as the bases are only stored in a database (hereinafter referred to as DB) in advance, and there is no detailed description regarding a definition method.

According to the example embodiments of the present invention to be described hereinafter, the above-described problems are solved, a person can intuitively define a behavior to be desirably estimated, and the behavior can be automatically estimated even in a state where there is no learning data or there is extremely little learning data. Furthermore, a mechanism for determining whether it is possible to cover a behavior by conversion using a conversion formula is provided, and thus, it is also possible to prevent deterioration in identification performance as a result of the conversion of a feature.

According to the example embodiments of the present invention to be described hereinafter, a calculation formula for converting skeleton information acquired from various behaviors into a lower-dimensional feature vector, so that a behavior of a person can be expressed in a simple and more abstract form. Even in a case where the number of behaviors to be desirably estimated is increased, the abstraction based on the same calculation formula enables efficient progress of machine learning even with a small amount of learning data.

1 First Example Embodiment

1. Overview)

Hereinafter, example embodiments of the present invention will be described. An information processing device 100 according to a first example embodiment defines basic motions (such as shaking an arm) of a human body in advance. When information is obtained from a sensor (not illustrated), the information processing device 100 detects a person and estimates skeleton information of the person. The information processing device 100 converts the skeleton information into vector information indicating information obtained by combining the basic motions defined in advance. Accordingly, the skeleton information of the person can be converted into the vector information that is more easily understood by a human, and thus, there is an effect that it is easy for the human to intuitively define a behavior to be desirably estimated.

(1.2 System Configuration)

FIG. 1 illustrates a configuration diagram of the information processing device 100. Hereinafter, an outline of the information processing device according to the first example embodiment will be described with reference to FIG. 1.

The information processing device 100 includes a sensor information acquisition unit 101, a skeleton information deriving unit 102, a feature conversion unit 103, a feature conversion formula definition unit 104, a covering determining unit 105, and a feature conversion formula DB 106.

The sensor information acquisition unit 101 receives an input of sensor information from one or more sensors (not illustrated). The sensor (not illustrated) may be a device such as a visible light camera, an infrared camera, and a depth sensor, but are not limited thereto. The sensor information described above is information acquired from the sensor such as the visible light camera, the infrared camera, and the depth sensor, and may be, for example, an image, but is not limited thereto. The information received by the sensor information acquisition unit 101 may be information acquired in the past by the sensor (not illustrated).

The skeleton information deriving unit 102 detects a person from an image indicated by one or more pieces of the sensor information sequentially acquired by the sensor information acquisition unit 101. When a person exists in the image indicated by the sensor information, the skeleton information deriving unit 102 derives skeleton information of the person from the sensor information.

Figure 2:
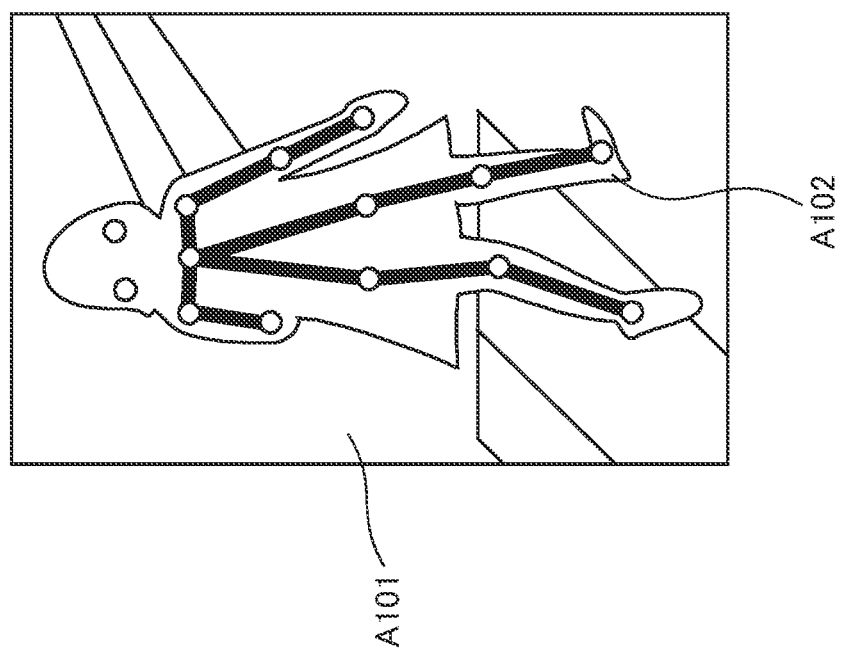
FIG. 2 is an example illustrating a concept of skeleton information.

FIG. 2 is an example of visually indicating sensor information A101 and skeleton information A102. Normal walking of a person will be exemplified for the sake of description. The skeleton information A102 is information indicating a skeleton of the person or a motion of the person. It is assumed that the skeleton information A102 includes position information on sensor coordinates or world coordinates of a head, a neck, both elbows, both hands, a waist, both knees, and both feet, but may include only some of them. An existing technique can be used to detect a person and derive skeleton information of the person. For example, when a camera is used as the sensor (not illustrated), there is a method of learning a shape of a person by a framework of machine learning. A public program may be used.

The feature conversion unit 103 converts the skeleton information obtained by the skeleton information deriving unit 102 into a feature vector A103 using a feature conversion formula A104 to be described later. The feature conversion formula A104 is a calculation formula stored in the feature conversion formula DB 106.

Figure 3:
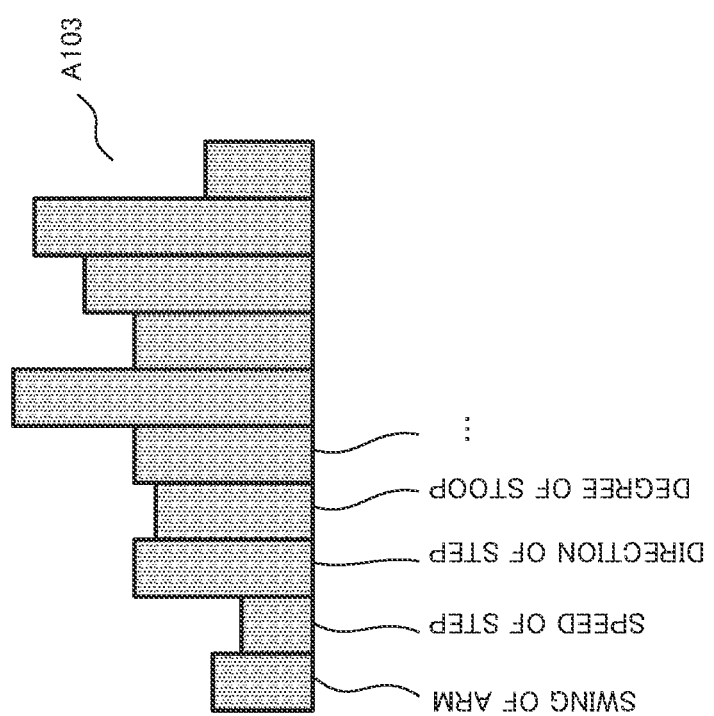
FIG. 3 is an example obtained by visualizing a feature vector.

FIG. 3 is an example in which the feature vector A103 is expressed by a bar graph. It is assumed that the skeleton information illustrated in FIG. 2 has been converted. The feature vector A103 is information expressed in a lower dimension than the skeleton information A102, and is a feature vector expressing basic motions that are easy for a human to understand. The basic motions that are easy for the human to understand include "a swing of an arm", "putting out an arm", "putting out a foot", "bending over a back", and the like, and represent motions constituting an advanced behavior of a human, such as "normal walking", "staggering walking", "accompanying", and "gathering".

A target to be converted by the feature conversion unit 103 may be one piece of skeleton information derived by the skeleton information deriving unit 102 from sensor information acquired at a predetermined time, or may be a skeleton information sequence (hereinafter, the skeleton information sequence is also referred to as the skeleton information) including a plurality of pieces of skeleton information derived by the skeleton information deriving unit 102 from pieces of sensor information acquired at a plurality of times.

Figure 4:
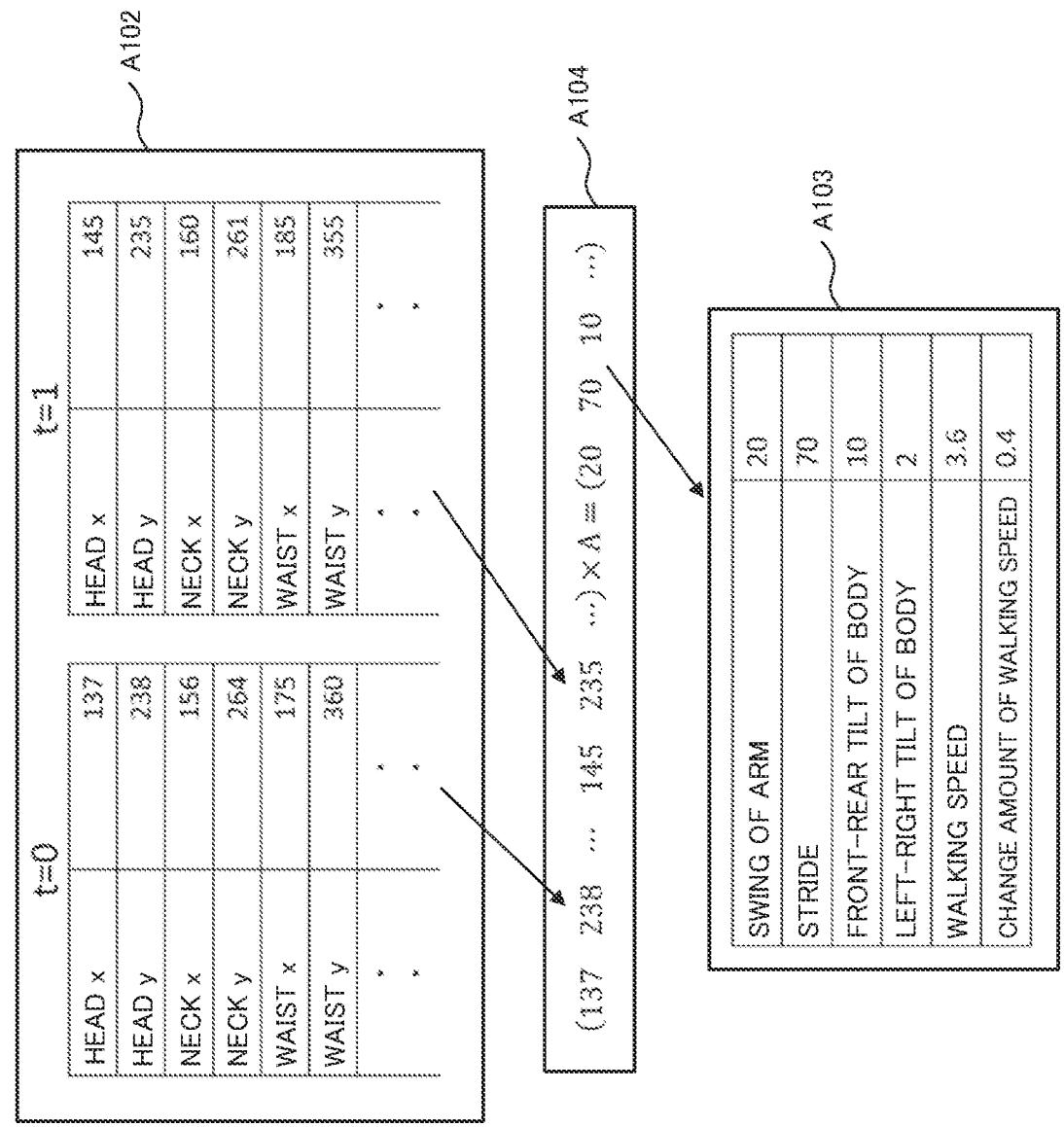
FIG. 4 is an example imitating a flow of feature conversion according to the present example embodiment.

FIG. 4 illustrates an example of a flow of feature conversion executed by the feature conversion unit 103 and features before and after the conversion. In FIG. 4, it is assumed that pieces of the skeleton information A102 obtained from pieces of sensor information acquired at two different times t (t=0 and t=1) are converted into one feature vector A103 as an example using the pieces of sensor information acquired at a plurality of times. The conversion illustrated in FIG. 4 is merely an example, and the invention is not limited to this conversion method.

The feature conversion formula definition unit 104 defines the feature conversion formula A104 to be used by the feature conversion unit 103 to convert the skeleton information A102 into the feature vector A103.

Although it is conceivable that the conversion indicated by the feature conversion formula A104 is performed by linear conversion, it is preferable to enable inverse conversion even in a case where the other conversion methods are used. The feature conversion formula may be calculated manually in advance.

The feature conversion formula A104 may be automatically obtained by a framework of machine learning after the basic motions are defined in advance. In this case, the feature conversion formula definition unit 104 can be designed to receive an input from the skeleton information deriving unit 102. The feature conversion formula definition unit 104 is not limited to what is achieved by the methods exemplified above. The conversion formula is not limited to what is obtained by the methods exemplified above.

When the skeleton information A102 has been converted using the feature conversion formula A104 defined by the feature conversion formula definition unit 104, the covering determining unit 105 determines whether the feature vector A103 obtained after the conversion can cover a human behavior.

As a determination method, for example, a method is conceivable in which pieces of the skeleton information A102 indicating various behaviors (desirably including motions of feet, hands, a head, or the like that are greatly different) are converted using the feature conversion formula A104, and determination is made using a variance of elements and a correlation coefficient between elements in the converted feature vector A103. Covering is higher as the variance of the elements in the converted feature vector A103 is larger (values are distributed in a wider range) and the correlation coefficient between the elements in the feature vector A103 is closer to zero (there is a high possibility that the elements are independent of each other).

Figure 5:
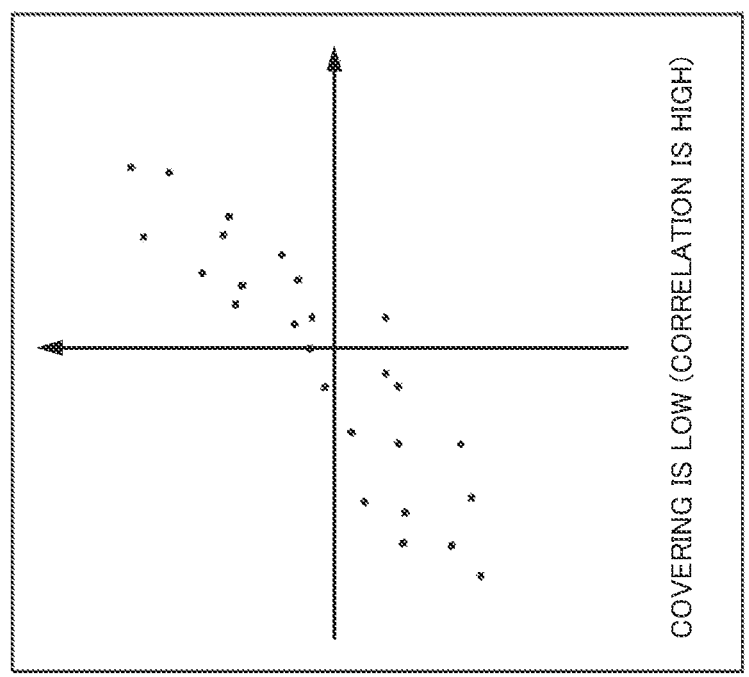
FIG. 5 is an example of covering determination in the present example embodiment.
Figure 6:
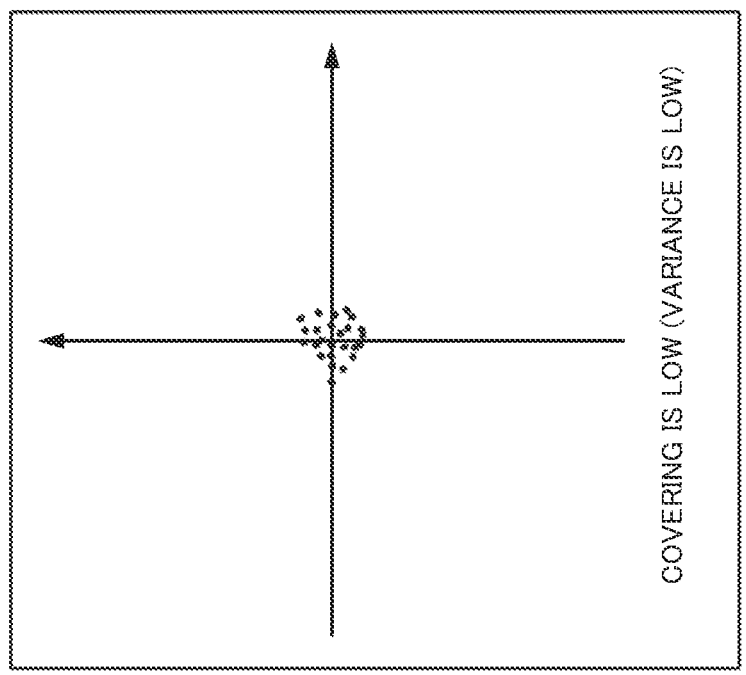
FIG. 6 is an example of covering determination in the present example embodiment.
Figure 7:
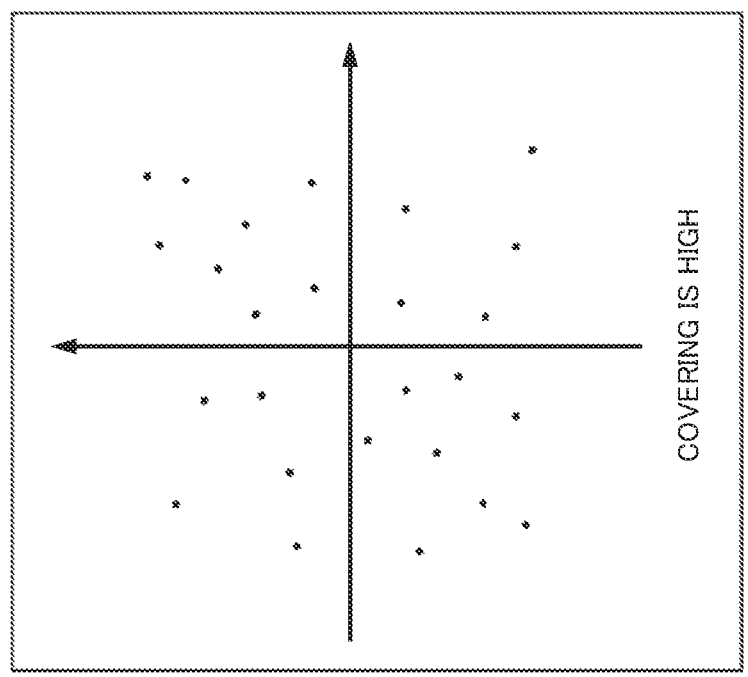
FIG. 7 is an example of covering determination in the present example embodiment.

An example of determining covering based on the above criteria will be described with reference to FIGS. 5 to 7. Plots in FIGS. 5 to 7 illustrate the converted feature vectors A103. Graphs illustrated in FIGS. 5 to 7 assume that the feature conversion unit 103 converts the skeleton information A102 into the feature vector A103, thereby reducing a dimension of the information to two dimensions. The graph illustrated in FIG. 5 has a high correlation between two axes, and the graph illustrated in FIG. 6 has a small variance of elements, and thus, covering is low. On the other hand, the graph illustrated in FIG. 7 has a low correlation between two axes and a large variance of elements, and thus, is a desirable form with high covering.

Figure 8:
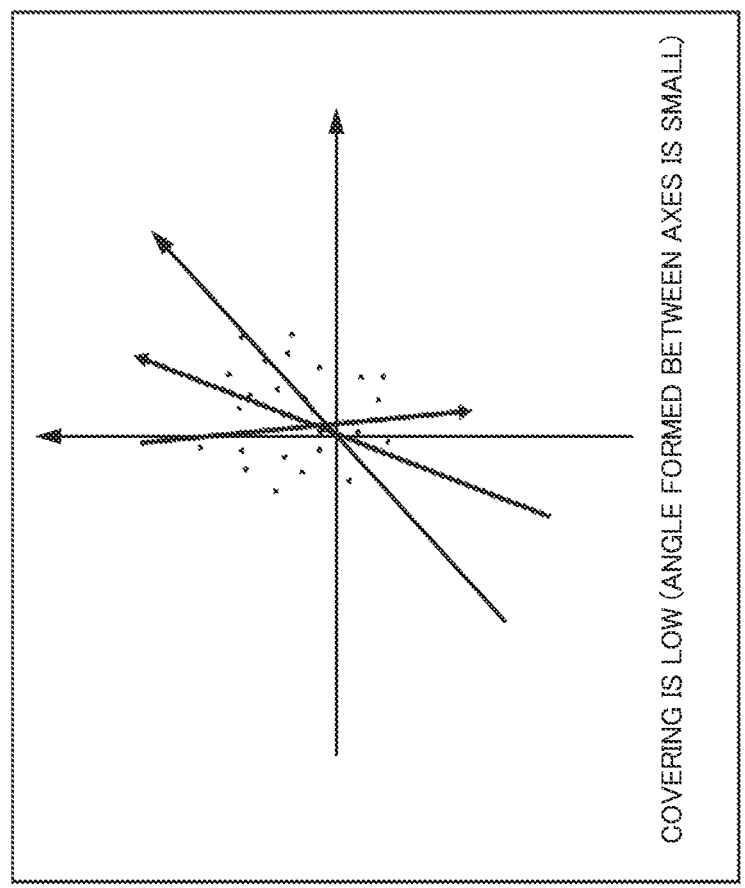
FIG. 8 is an example of covering determination in the present example embodiment.
Figure 9:
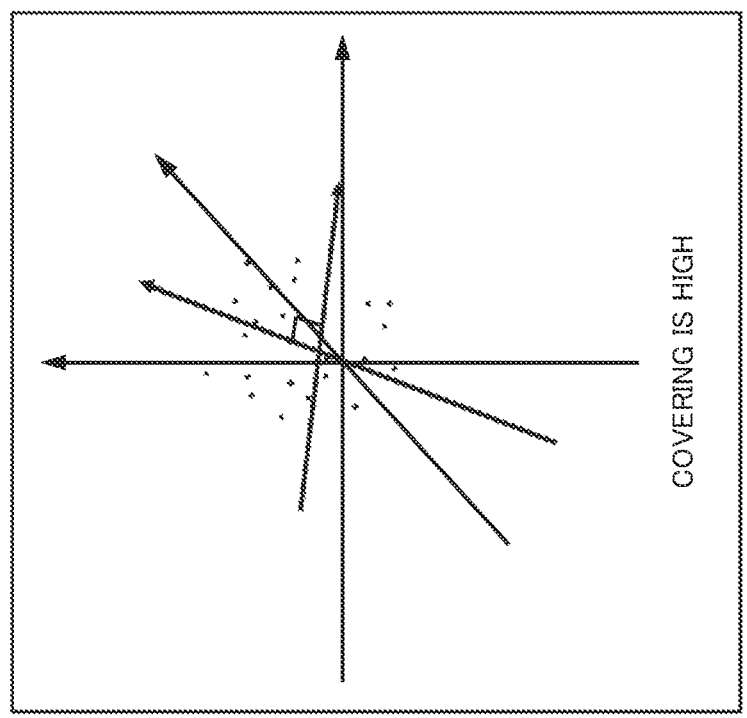
FIG. 9 is an example of covering determination in the present example embodiment.

Another example of determining covering will be described with reference to FIGS. 8 and 9. FIGS. 8 and 9 assume that the feature conversion unit 103 converts the skeleton information A102 into the feature vector A103 to reduce a dimension of the information to be handled from three dimensions to two dimensions.

In a case where the feature conversion formula A104 defined by the feature conversion formula definition unit 104 is linear conversion, the covering determining unit 105 can also make a determination based on a variance in the axes and an angle formed by the axes when the axes after the conversion are projected onto a space before the conversion. It can be said that covering is higher as the variance in the axes is larger (values are distributed in a wider range), and the angle formed by the axes is closer to a right angle (the axes are independent of each other). In a graph illustrated in FIG. 8, an angle formed by two axes is too small, and thus, covering is low. In a graph illustrated in FIG. 9, two axes are orthogonal to each other, and it can be determined that a variance of elements is appropriate and covering is high.

That is, in the present specification, "covering" is defined as an index indicating whether the converted feature vectors A103 are evenly distributed on a feature space when pieces of the skeleton information A102 indicating a plurality of different behaviors have been converted into the feature vectors A103. "High covering" indicates that the degree at which pieces of the skeleton information A102 indicating various behaviors of persons can be comprehensively and appropriately converted is high with a small distribution bias of the converted feature vector A103 when the plurality of pieces of the skeleton information A102 indicating the various behaviors are converted by the above-described method On the other hand, "low covering" indicates that the degree at which pieces of the skeleton information A102 indicating various behaviors of persons can be comprehensively and appropriately converted is low with a large distribution bias of the converted feature vector A103 when the plurality of pieces of the skeleton information A102 indicating the various behaviors are converted by the above-described method Such "high covering" and "low covering" refer to the nature of the feature conversion formula itself.

When the covering determining unit 105 determines the feature conversion formula has low covering, the feature conversion formula definition unit 104 redefines the feature conversion formula A104. When the covering determining unit 105 determines that the feature conversion formula A104 has high covering, the feature conversion formula A104 is stored in the feature conversion formula DB 106.

As described above, the information processing device 100 according to the present example embodiment can convert the skeleton information into simple information that is more easily understood by a human.

3 Flow of Processing)

Figure 10:
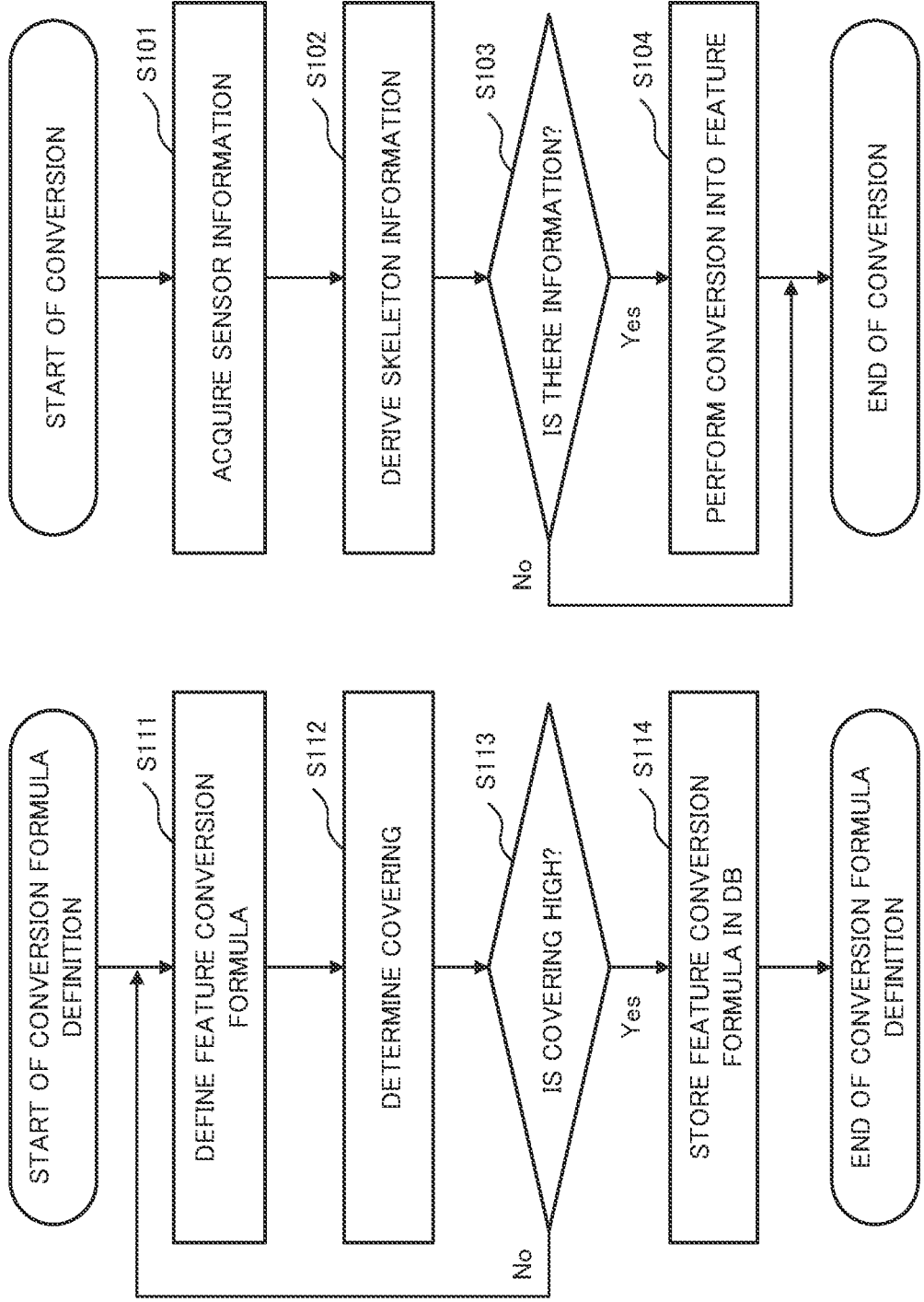
FIG. 10 is a flowchart illustrating a flow of processing of the present example embodiment.

Hereinafter, a flow of processing of the information processing device 100 will be described with reference to FIG. 10. FIG. 10 is a flowchart illustrating the flow of processing of the information processing device 100. The processing of the present system is divided into two stages including a stage of defining a feature conversion formula and a stage of executing conversion using the feature conversion formula, and thus, the flowchart will be also separately described.

The feature conversion formula definition unit 104 defines the feature conversion formula A104 to be used by the feature conversion unit 103 to convert the skeleton information A102 into the feature vector A103. (S111).

The covering determining unit 105 determines covering of the feature conversion formula A104 (S112 and S113). When the covering determining unit 105 determines that the feature conversion formula A104 has high covering, the feature conversion formula is stored in the feature conversion formula DB 106 (S114). On the other hand, when determining that the covering is low, the covering determining unit 105 returns to the process of step S111.

The sensor information acquisition unit 101 receives an input of the sensor information A101 from a sensor such as a camera and a depth sensor (S101).

The skeleton information deriving unit 102 detects a person from the sensor information A101 and derives the skeleton information A102 of the person (S102). Here, in a case where the skeleton information deriving unit 102 has failed in detecting the person from the sensor information A101 or in a case where deriving of the skeleton information A102 of the person has failed, the processing is ended (S103).

The feature conversion unit 103 converts the skeleton information A102 into the feature vector A103 based on the feature conversion formula A104 stored in the feature conversion formula DB 106 (S104).

4 Effects According to Present Example Embodiment)

As described above, the information processing device 100 according to the present example embodiment makes it possible to convert the skeleton information into the lower-dimensional feature that is easy for the human to understand while ensuring the covering of the behavior of the person. As a result, the following two effects are obtained.

First, it is possible to recognize the behavior of the person with a small amount of learning data. The above-described problem that a large amount of learning data is required for the behavior recognition is caused by the fact that sensor information before conversion processing has too much extra information and a large amount of learning data is required to select information that is actually necessary to perform the behavior recognition from among pieces of the information.

According to the present example embodiment, the sensor information is appropriately abstracted in the form of the skeleton information of the person and the information is converted into the lower-dimensional feature, and thus, it is possible to greatly reduce a process of selecting information necessary for performing the behavior recognition. Although the machine learning is sometimes required to acquire the skeleton information and perform the feature conversion, learning may be performed in advance with general learning data since the acquisition of the skeleton information and the feature conversion do not depend on persons or types of behaviors in the present example embodiment. Therefore, it is possible to greatly reduce the number of pieces of learning data newly required at the time of increasing the number of types of behaviors to be desirably recognized.

Second, the behavior can be easily defined from the converted feature vector. If values of elements of a feature vector are defined by a human and the defined vector is converted by an inverse operation of a formula stored in the feature conversion formula DB, skeleton information can be restored. When the obtained skeleton information is applied to a movement model of a human body reproduced on a computer by computer graphics (CG), a behavior defined by the feature vector can be visualized. Moreover, the model can be intuitively operated since the elements of the feature vector have meanings easy for a human to understand. For example, if a parameter of "the magnitude of a swing of an arm" is increased, the swing of the arm in the model also increases. When behaviors to be desirably recognized by the computer increase, the number of targets to be recognized can be increased without performing additional learning if the behaviors are defined by this mechanism.

2 Second Example Embodiment

1. Overview)

When information is obtained from a sensor, an information processing device 200 according to a second example embodiment detects a person, estimates skeleton information of the person, and converts the skeleton information into low-dimensional vector information, which is similar to the first example embodiment. However, a meaning of an element of the vector information is not defined, and a feature conversion formula for performing conversion into the vector information, which enables efficient learning by a computer, is defined, which is different from the first example embodiment. Accordingly, the feature vector specialized and abstracted for learning can be obtained, and thus, the number of pieces of learning data can be further reduced.

(2.2 System Configuration)

Figure 11:
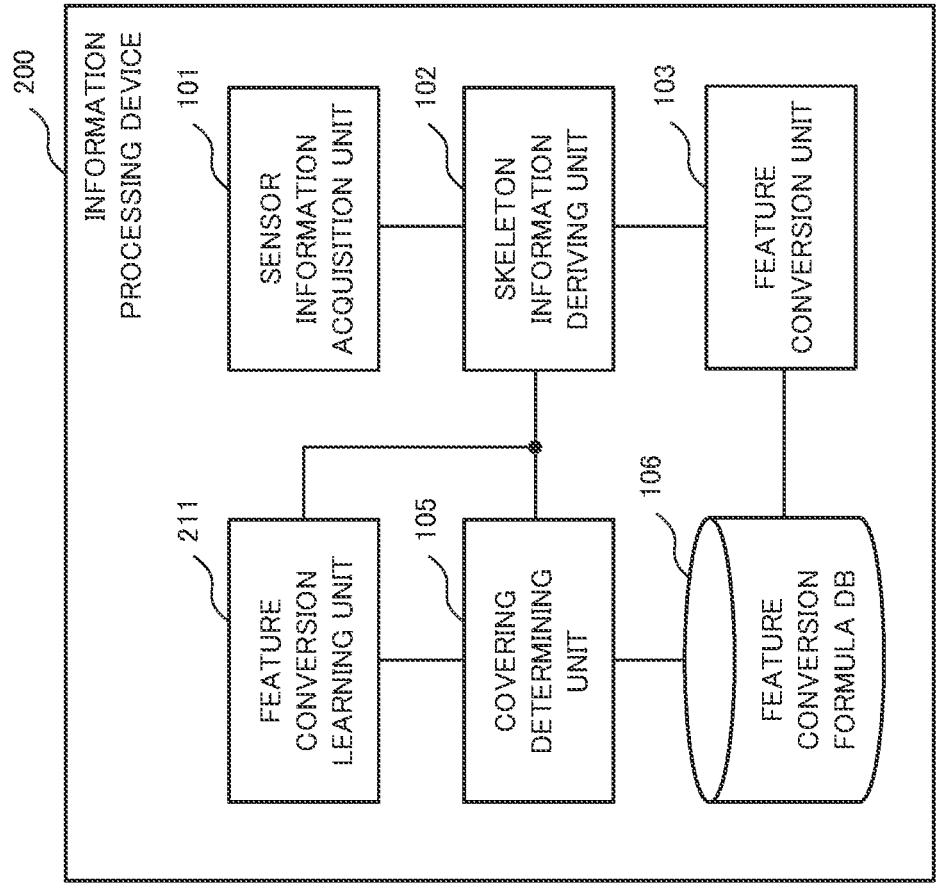
FIG. 11 is an example of a configuration diagram of an information processing device according to a present example embodiment.

FIG. 11 illustrates a configuration diagram of the information processing device 200. Hereinafter, an outline of an object feature extraction system according to the second example embodiment will be described with reference to FIG. 11.

The information processing device 200 includes the sensor information acquisition unit 101, the skeleton information deriving unit 102, a feature conversion learning unit 211, the covering determining unit 105, the feature conversion formula DB 106, and a feature conversion unit 103.

The sensor information acquisition unit 101, the skeleton information deriving unit 102, the feature conversion formula DB 106, and the feature conversion unit 103 are similar to those in the first example embodiment. The information processing device 200 according to the present example embodiment is different from that of the first example embodiment in terms of including the feature conversion learning unit 211.

The feature conversion learning unit 211 obtains a feature conversion formula B104 to be used by the feature conversion unit 103 to convert the skeleton information A102 into a low-dimensional vector by machine learning using the skeleton information A102. In the machine learning, it is possible to use an existing technique such as a technique of performing dimension reduction by principal component analysis and a technique using a final layer of deep learning as a feature vector. The feature conversion learning unit 211 receives an input of learning data. This learning data is a feature (for example, a vector or a matrix) obtained based on the skeleton information A102. At this time, one feature may be obtained from one piece of the skeleton information A102, or one feature may be obtained from a plurality of pieces of the skeleton information A102. One feature may be obtained from a plurality of pieces of the skeleton information A102 acquired along the time series. An example of this feature will be described hereinafter. For example, a feature in which values of sensor coordinates or world coordinates of body parts included in the skeleton information A102 are sequentially arrayed may be used as the feature (input vector) to be input to the feature conversion learning unit 211. For example, when coordinates of points are Point 0 (x0, y0), Point 1 (x1, y1), . . . , and Point 13 (x13, y13), (x0, y0, x1, y1, . . . , x13, and y13) may be used as the input vector. In the case of using the plurality of pieces of skeleton information A102, it is assumed that the number of dimensions is increased by two or three times. In another example, a feature to be input to the feature conversion learning unit 211 may be a feature obtained by mapping the skeleton information A102 on an image. In the case of using the plurality of pieces of skeleton information A102, the number of images can be increased according to the number of pieces of the skeleton information A102 to be used. The above-described features are merely examples, and the other features may be used as learning data. The above-described feature serves as one learning data. A large number of these features are prepared and input per behavior type. The feature conversion learning unit 211 outputs the feature conversion formula B104 by the machine learning.

When the skeleton information A102 is converted using the feature conversion formula B104 obtained by the feature conversion learning unit 211, the covering determining unit 105 determines whether the converted feature vector B103 can cover a human behavior. In a case where the feature conversion learning unit 211 adopts the technique based on principal component analysis, a cumulative contribution ratio up to a reduced dimension can be used as a determination criterion. On the other hand, in the case of using the other techniques, for example, the technique based on deep learning, the determination can be made by the same technique as the covering determining unit 105 in the first example embodiment.

The feature conversion learning unit 211 redefines the feature conversion formula B104 according to a determination result of the covering determining unit 105. When the covering determining unit 105 determines that covering is low, the feature conversion unit 103 redefines the feature conversion formula B104. In the case where the feature conversion learning unit 211 adopts the technique based on principal component analysis, a process of decreasing the number of dimensions to be reduced (increasing the number of dimensions to be used) may be performed. When the covering determining unit 105 determines that covering is high, the feature conversion learning unit 211 stores the feature conversion formula B104 in the feature conversion formula DB 106.

Figure 12:
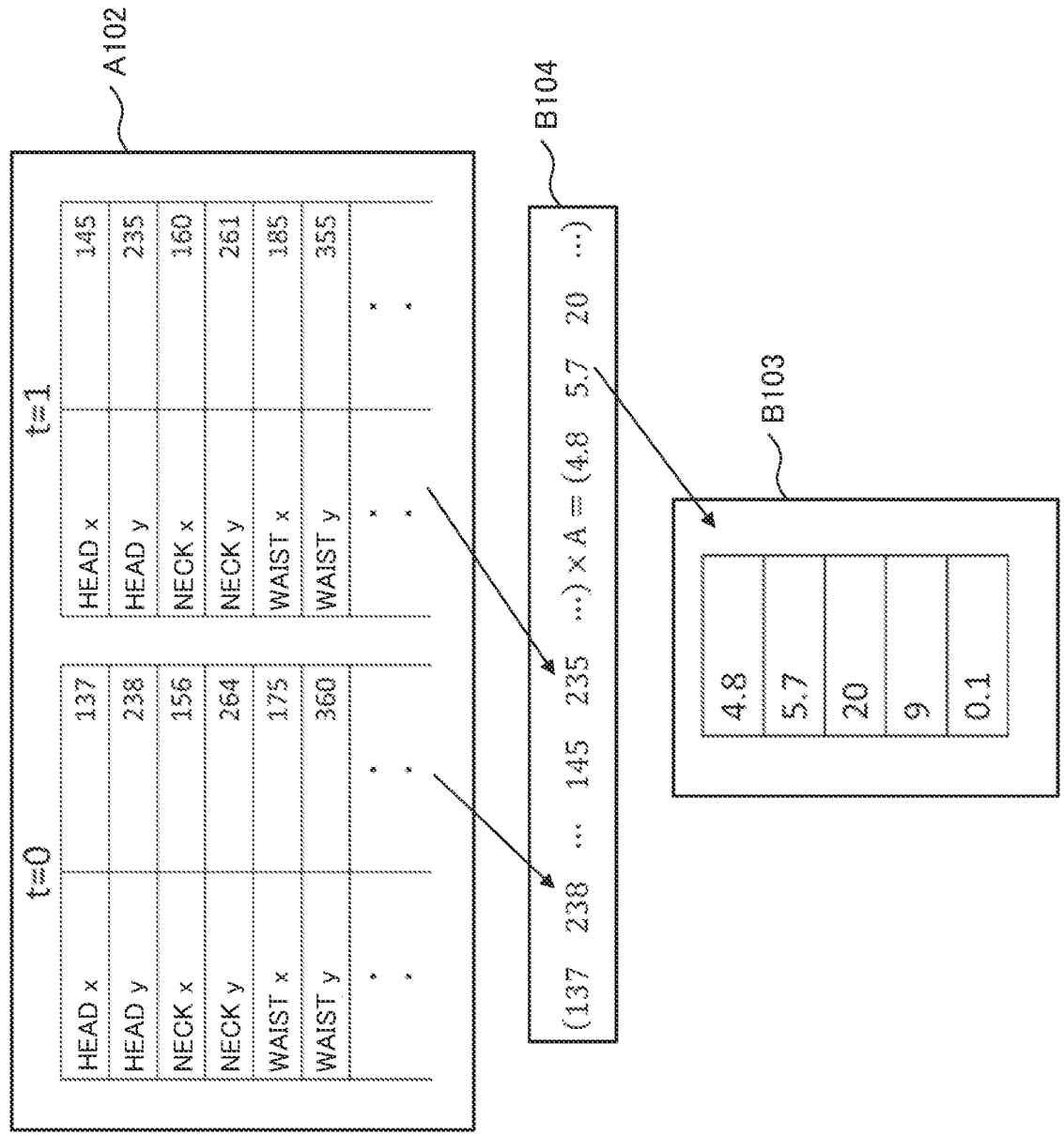
FIG. 12 is an example imitating a flow of feature conversion according to the present example embodiment.

FIG. 12 is an example illustrating a flow in which the feature conversion unit 103 converts the skeleton information A102 and concepts of features before and after the conversion. Preconditions in FIG. 12 are similar to those in FIG. 4, and a concept of the skeleton information A102 is also similar to that in FIG. 4.

The concept illustrated in FIG. 12 is different from that in FIG. 4 in that it is not necessary to give meanings that can be understood by a human to all elements of the feature vector B103 converted by the feature conversion unit 103, and conversion is performed to the minimum number of dimensions for the purpose of efficient learning. Accordingly, the feature conversion formula B104 in FIG. 12 is defined by a computer, which is different from the feature conversion formula A104 in FIG. 4.

As described above, the skeleton information can be converted into simple information that can be efficiently learned.

3 Flow of Processing)

Figure 13:
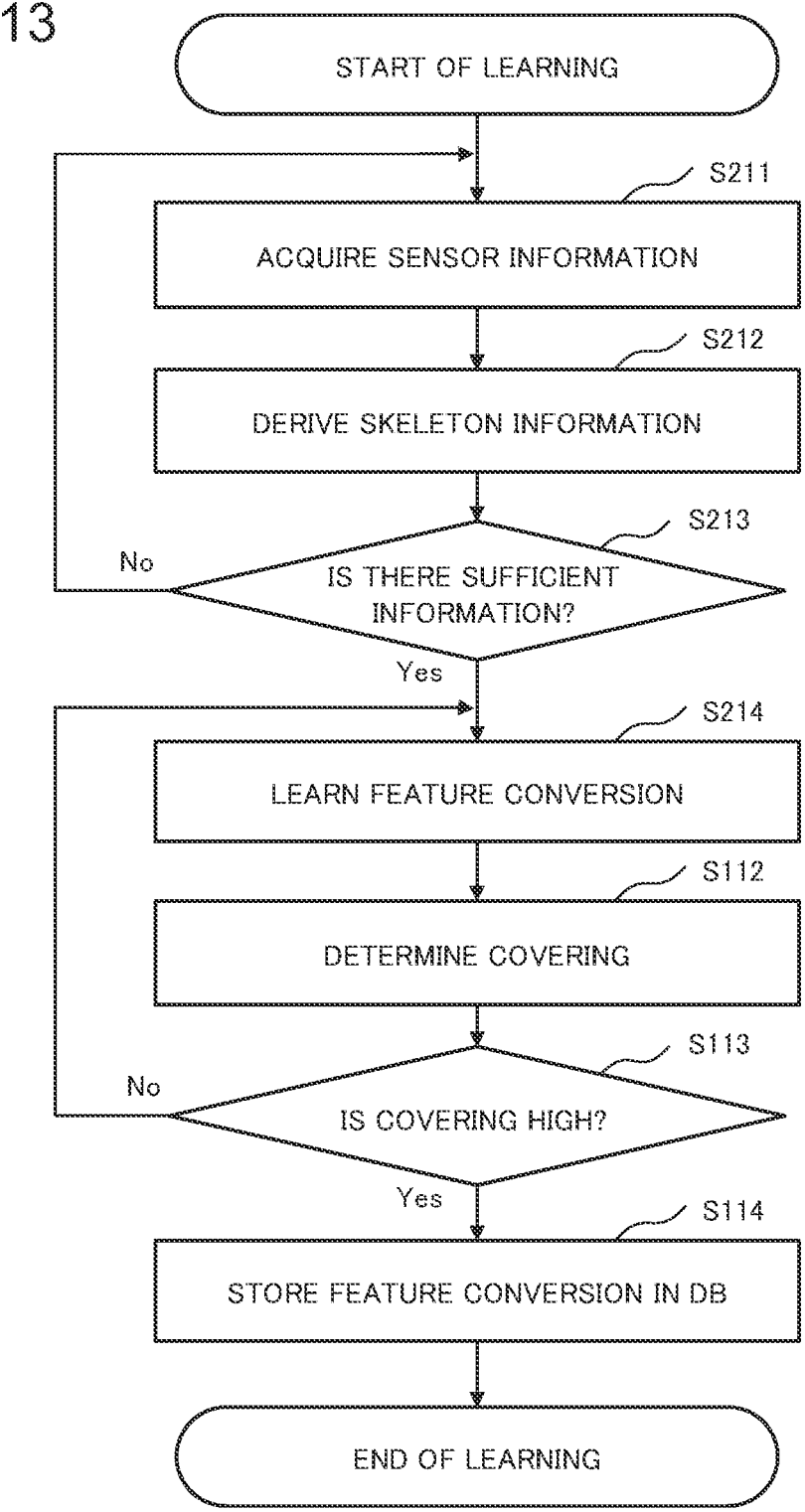
FIG. 13 is a flowchart illustrating a flow of processing of the present example embodiment.

Hereinafter, a flow of processing of the information processing device will be described with reference to FIG. 13. FIG. 13 is a flowchart illustrating the flow of processing of the information processing device 200.

The processing of the present example embodiment is divided into two of learning processing and conversion processing. A flow of the conversion processing of the present example embodiment is similar to conversion processing in the first example embodiment. Hereinafter, only the learning processing of the present example embodiment will be described.

The sensor information acquisition unit 101 receives an input of sensor information from a sensor such as a camera and a depth sensor (S211).

The skeleton information deriving unit 102 detects a person from the sensor information obtained from the sensor information acquisition unit 101 and derives the skeleton information A102 of the person (S212).

The feature conversion learning unit 211 accumulates pieces of the skeleton information A102 obtained by the skeleton information deriving unit 102. When the number of samples of the skeleton information A102 accumulated in the feature conversion learning unit 211 does not satisfy a number necessary for learning, the process returns to step S211 (S213). When the number of samples of the skeleton information A102 accumulated in the feature conversion learning unit 211 satisfies the number necessary for learning, the feature conversion formula B104 for converting the skeleton information A102 into the low-dimensional feature vector B103 by machine learning is obtained using the accumulated skeleton information A102 as learning data (S214).

The covering determining unit 105 determines covering of the feature conversion formula B104 (S112).

When it is determined that the feature conversion formula B104 has high covering as a result of the determination in S112, the feature conversion learning unit 211 stores the feature conversion formula B104 in the feature conversion formula DB 106 (YES in S113 and S114). On the other hand, when it is determined that covering is low as a result of the determination in S112, the process returns to step S211 (NO in S113).

In a case where the feature conversion learning unit 211 has already performed feature conversion learning based on principal component analysis at the time of returning from step S113 to step S214, the process of decreasing the number of dimensions to be reduced (increasing the number of dimensions to be used) may be performed in step S214 using a result of the principal component analysis that has already been performed.

4 Effects According to Present Example Embodiment

As described above, the information processing device 200 according to the present example embodiment can convert the skeleton information A102 into the lower-dimensional feature. As a result, the number of samples of learning data necessary for learning a behavior of a person can be further reduced as compared with the first example embodiment. This is because of the following reasons.

The first example embodiment performs conversion into a vector having the magnitude of a basic motion that is easy for a human to understand as an element. As a result, it is easy for the human to understand a meaning of the converted feature vector and it is possible to reproduce a behavior. However, there is a restriction that a design is made in such a way as to facilitate easy understanding by a human, and thus, abstraction of information more than a certain level is not possible. On the other hand, there is no restriction that a design is made in such a way as to facilitate easy understanding by a human in the present example embodiment. Therefore, the abstraction of information can be performed as much as possible although it is difficult for the human to understand the meaning of the feature vector, and thus, the machine learning can be performed more efficiently.

3 Third Example Embodiment

Next, a functional configuration of an information processing device 300 according to a third example embodiment of the present invention will be described with reference to FIG. 14.

(3.1 System Configuration)

Figure 14:
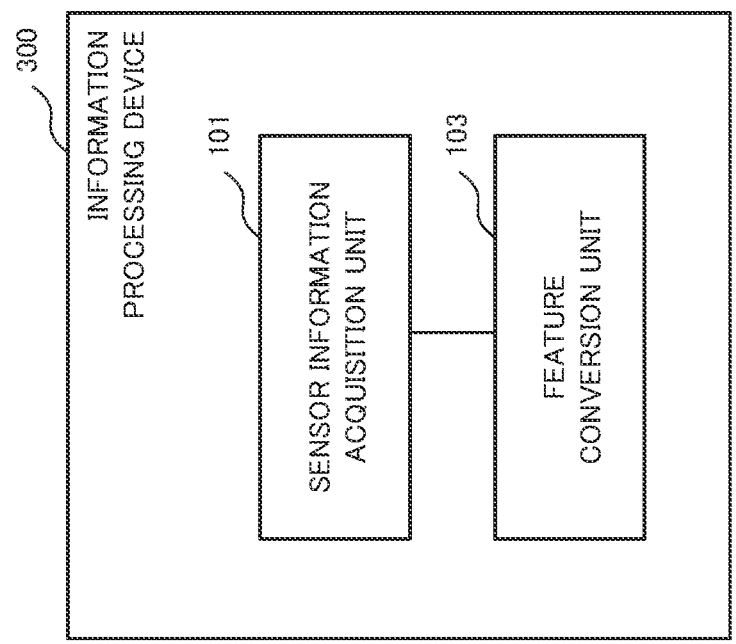
FIG. 14 is an example of a configuration diagram of an information processing device of a present example embodiment.

FIG. 14 is a block diagram illustrating a configuration example of the third example embodiment of the present invention.

As illustrated in FIG. 14, the information processing device 300 according to the present example embodiment includes the sensor information acquisition unit 101 and the feature conversion unit 103.

The sensor information acquisition unit 101 acquires an image including a person.

The feature conversion unit 103 converts skeleton information A102 extracted from the image acquired by the sensor information acquisition unit 101 into a feature vector A103.

(3.2 Flow of Processing)

Figure 15:
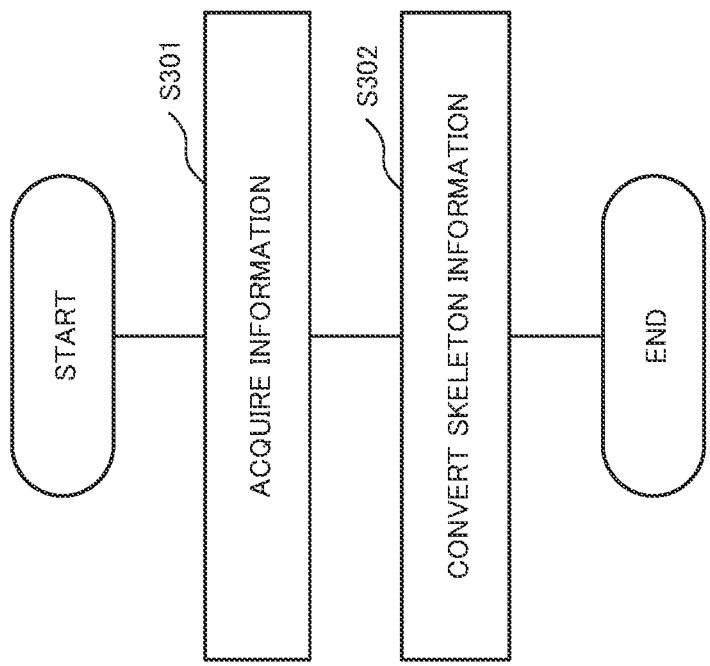
FIG. 15 is a flowchart illustrating a flow of processing of the present example embodiment.

FIG. 15 is a flowchart illustrating an operation of the information processing device 300 according to the third example embodiment.

The sensor information acquisition unit 101 acquires an image including a person (S301).

The feature conversion unit 103 converts the skeleton information A102 extracted from the image acquired by the sensor information acquisition unit 101 into the feature vector A103 (S302).

(3.3 Effects According to Present Example Embodiment)

As described above, the skeleton information is converted into the feature vector having a lower dimension according to the information processing device according to the third example embodiment.

(Hardware Configuration)

Next, a description will be given regarding an example of a hardware configuration that implements the information processing devices (100, 200, 300) in the above-described example embodiments using one or more computers. Functional units included in the information processing devices (100, 200, 300) are achieved by any combination of hardware and software mainly including at least one central processing unit (CPU) of any computer, at least one memory, a program loaded into the memory, a storage unit such as at least one hard disk storing the program, an interface for network connection, and the like. It will be understood by those skilled in the art that there are various modifications of such implementation methods and devices. The storage unit can store not only a program stored before shipment of the device but also a program downloaded from a storage medium such as an optical disk, a magneto-optical disk, and a semiconductor flash memory, a server on the Internet, or the like.

FIG. 16 is a block diagram illustrating the hardware configuration of the information processing device (100, 200, 300). As illustrated in FIG. 16, the information processing device (100, 200, 300) includes a processor 1A, a memory 2A, an input/output interface 3A, a peripheral circuit 4A, a communication interface 5A, and a bus 6A. The peripheral circuit 4A includes various modules. The information processing devices (100, 200, 300) do not necessarily include the peripheral circuit 4A. The information processing devices (100, 200, 300) may be configured as a plurality of physically and/or logically separated devices. In this case, the plurality of devices can have the above-described hardware configuration.

The bus 6A is a data transmission path through which the processor 1A, the memory 2A, the input/output interface 3A, the peripheral circuit 4A, and the communication interface 5A mutually transmit and receive data. The processor 1A is an arithmetic processing device such as a CPU, a graphics processing unit (GPU), and a microprocessor. The processor 1A can execute processing according to various programs stored in the memory 2A, for example.

The memory 2A is, for example, a memory such as a random access memory (RAM) and a read only memory (ROM), and stores programs and various data.

The input/output interface 3A includes an interface configured to acquire information from an input device, an external device, an external storage unit, an external sensor, a camera, and the like, and an interface configured to output information to an output device, an external device, an external storage unit, and the like. Examples of the input device include a touch panel, a keyboard, a mouse, a microphone, and a camera. Examples of the output device include a display, a speaker, a printer, a lamp, and the like.

The processor 1A can issue a command to the modules and perform computing based on computing results of the modules.

The communication interface 5A achieves mutual communication between the information processing device (100, 200, 300) and an external device, and also achieves mutual communication among the information processing devices (100, 200, 300). Some functions of the information processing devices (100, 200, 300) may be configured by a computer.

(3 Supplementary Matters)

The configurations of the above-described example embodiments may be combined or some constituent portions may be interchanged. The configuration of the present invention is not limited to the above-described example embodiments, and various modifications may be made within a scope not departing from a gist of the present invention. Some or all of the above example embodiments may be described as the following supplementary notes, but are not limited to the following.

(Supplementary Note 1)

An information processing device including:
an information acquisition means configured to acquire an image including a person; and
a feature conversion means configured to convert skeleton information extracted from the image into a feature vector which indicates elements constituting a behavior of the person and is a lower dimension than the skeleton information.

(Supplementary Note 2)

The information processing device according to Supplementary Note 1, wherein the feature conversion means converts the skeleton information using a feature conversion formula determined to cover the behavior of the person.

(Supplementary Note 3)

The information processing device according to Supplementary Note 1 or 2, further including:
a conversion formula definition means configured to define a feature conversion formula to be used by the feature conversion means to convert the skeleton information into the feature vector; and
a covering determining means configured to determine whether the feature conversion formula covers the behavior of the person.

(Supplementary Note 4)

The information processing device according to Supplementary Note 3, wherein
the conversion formula definition means defines the feature conversion formula depending on a determination result of the covering determining means.

(Supplementary Note 5)

The information processing device according to Supplementary Note 3 or 4, further including
a storage means configured to store the feature conversion formula depending on a determination result of the covering determining means.

(Supplementary Note 6)

The information processing device according to any one of Supplementary Notes 3 to 5, wherein
the feature vector includes one or more elements indicating the behavior of the person, and
the covering determining means determines whether the behavior of the person is covered by at least one of a variance of the elements in the feature vector or a correlation coefficient between the elements in the feature vector.

(Supplementary Note 7)

The information processing device according to any one of Supplementary Notes 3 to 5, wherein
the conversion formula definition means executes a process of learning data including the skeleton information and obtaining the feature conversion formula.

(Supplementary Note 8)

The information processing device according to any one of Supplementary Notes 1 to 7, further including
a skeleton information deriving means configured to extract skeleton information of a person when an image includes the person.

(Supplementary Note 9)

The information processing device according to any one of Supplementary Notes 1 to 8, wherein
the skeleton information includes position information of a part of a person.

(Supplementary Note 10)

The information processing device according to Supplementary Note 9, wherein the part of the person includes at least one of a head, a neck, a left elbow, a right elbow, a left hand, a right hand, a waist, a left knee, a right knee, a left foot, and a right foot.

(Supplementary Note 11)

An information processing method including:
acquiring an image including a person; and
converting skeleton information extracted from the image into a feature vector which indicates elements constituting a behavior of the person and is a lower dimension than the skeleton information.

(Supplementary Note 12)

A program recording medium that records a program for causing a computer to execute:
a process of acquiring an image including a person; and
a process of converting skeleton information extracted from the image into a feature vector which indicates elements constituting a behavior of the person and is a lower dimension than the skeleton information.

REFERENCE SIGNS LIST

100, 200, 300 information processing device
101 sensor information acquisition unit
102 skeleton information deriving unit
103 feature conversion unit
104 feature conversion formula definition unit
105 covering determining unit
106 feature conversion formula DB
211 feature conversion learning unit
A101 sensor information
A102 skeleton information
A103, B103 feature vector
A104, B104 feature conversion formula
1A processor
2A memory
3A input/output interface
4A peripheral circuit
5A communication interface
6A bus

What is claimed is:
1. An information processing device comprising:
a memory storing a computer program; and
at least one processor configured to run the computer program to execute:

acquire an image including a person; and
convert skeleton information extracted from the image into a feature vector which indicates elements constituting a behavior of the person and is a lower dimension than the skeleton information,
wherein the at least one processor is further configured to run the computer program to execute to:
define a feature conversion formula for converting the skeleton information into the feature vector, the feature conversion formula being an index indicating a size of distribution bias of the feature vector in the feature space; and
determine whether the feature conversion formula covers the behavior of the person.

2. The information processing device according to claim 1, wherein
the at least one processor is configured to run the computer program to execute to:
convert the skeleton information using the feature conversion formula covering the behavior of the person.

3. The information processing device according to claim 1, wherein
the at least one processor is configured to run the computer program to execute to:
define the feature conversion formula depending on a of determination whether the feature conversion formula covers the behavior of the person or not.

4. The information processing device according to claim 1, wherein
the at least one processor is further configured to run the computer program to execute to:
store the feature conversion formula depending on a of determination whether the feature conversion formula covers the behavior of the person or not.

5. The information processing device according to claim 1, wherein
the feature vector includes at least one element indicating the behavior of the person, and
the at least one processor is configured to run the computer program to execute to:
determine whether the behavior of the person is covered by at least one of a variance of the elements in the feature vector or a correlation coefficient between the elements in the feature vector.

6. The information processing device according to claim 1, wherein
the at least one processor is configured to run the computer program to execute to:
execute a process of learning data including the skeleton information and obtaining the feature conversion formula.

7. The information processing device according to claim 1, wherein
the at least one processor is further configured to run the computer program to execute to:
extract the skeleton information of the person included in the image.

8. The information processing device according to claim 1, wherein
the skeleton information includes position information of a part of the person.

9. The information processing device according to claim 8, wherein the part of the person includes at least one of a head, a neck, a left elbow, a right elbow, a left hand, a right hand, a waist, a left knee, a right knee, a left foot, and a right foot.

10. An information processing method comprising:
acquiring an image including a person; and
converting skeleton information extracted from the image into a feature vector which indicates elements constituting a behavior of the person and is a lower dimension than the skeleton information,
wherein the information processing method comprises:
defining a feature conversion formula for converting the skeleton information into the feature vector, the feature conversion formula being an index indicating a size of distribution bias of the feature vector in the feature space; and
determining whether the feature conversion formula covers the behavior of the person.

11. A non-transitory program recording medium that records a program for causing a computer to execute:
a process of acquiring an image including a person; and
a process of converting skeleton information extracted from the image into a feature vector which indicates elements constituting a behavior of the person and is a lower dimension than the skeleton information,
wherein the program causes the computer to execute:
a process of defining a feature conversion formula for converting the skeleton information into the feature vector, the feature conversion formula being an index indicating a size of distribution bias of the feature vector in the feature space; and
a process of determining whether the feature conversion formula covers the behavior of the person.

* * * * *